(12) United States Patent
Murakami et al.

(10) Patent No.: US 8,414,158 B2
(45) Date of Patent: Apr. 9, 2013

(54) ILLUMINATION DEVICE INCLUDING DOPPLER SENSOR

(75) Inventors: Tadashi Murakami, Hirakata (JP); Shigeo Gotou, Yao (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/291,196

(22) Filed: Nov. 8, 2011

(65) Prior Publication Data
US 2012/0126706 A1    May 24, 2012

(30) Foreign Application Priority Data
Nov. 24, 2010    (JP) .................................. 2010-260885

(51) Int. Cl.
*F21V 23/00*    (2006.01)
(52) U.S. Cl. ............ 362/276; 362/221; 362/222; 342/27
(58) Field of Classification Search .................. 362/260, 362/276, 802, 221, 222, 253; 315/149; 342/27, 342/28, 52, 417; 250/221; 367/93, 94
See application file for complete search history.

(56) References Cited

U.S. PATENT DOCUMENTS
8,172,423 B2 * 5/2012 Sobagaki et al. ............. 362/240
8,232,909 B2 * 7/2012 Kroeger et al. ................ 342/28

FOREIGN PATENT DOCUMENTS
| JP | 2004-139864 | 5/2004 |
| JP | 2006-032050 | 2/2006 |
| JP | 2009-105013 | 5/2009 |
| JP | 2009-129775 | 6/2009 |
| JP | 2009-168778 | 7/2009 |
| JP | 2010-055783 | 3/2010 |

* cited by examiner

*Primary Examiner* — Thomas Sember
(74) *Attorney, Agent, or Firm* — Bacon & Thomas, PLLC

(57) ABSTRACT

An illumination device includes a cover; a lamp including a light emitting unit; and a doppler sensor including a receiving unit, disposed on the same side as the lamp with respect to a first plane including a surface of the cover facing the lamp. In a cross section that intersects the receiving unit and is orthogonal to a central axis of the light emitting unit, "θ" between a boundary line of a detectable range of the receiving unit close to the lamp and a normal to the first plane, "d" between the central axis and the first plane, "r" of the light emitting unit; "y" between the first plane and the receiving unit; and "x" between the receiving unit and a second plane that includes the central axis of the light emitting unit and is orthogonal to the first plane satisfy the following equation.

$$x > (y + d)\tan\theta = \frac{r}{\cos\theta}$$

5 Claims, 3 Drawing Sheets

ILLUMINATION DEVICE INCLUDING DOPPLER SENSOR

FIELD OF THE INVENTION

The present invention relates to an illumination device including a doppler sensor.

BACKGROUND OF THE INVENTION

Conventionally, there has been disclosed an illumination device including a doppler sensor (see, e.g., Japanese Patent Application Publication No. 2009-168778). The illumination device detects a human body by using the doppler sensor and controls a light source to be turned on and off in accordance with the detected result of the human body. In such a kind of illumination device, it is possible to restrict wasteful power consumption that can be caused by user's negligence to turn off the light source in a case where the light source is manually turned on and off.

The doppler sensor is designed to transmit an electric wave (transmission wave), e.g., a millimeter wave, in a detectable range and receive the electric wave (reflection wave) reflected in the detectable range; combine (multiply) an electric signal obtained by receiving the reflection wave and an electric signal having the same frequency as that of the transmission wave; and extract from the obtained electric signal a component of a frequency band corresponding to a moving speed of a human body to thereby acquire a doppler signal. Then, by comparing an amplitude of the doppler signal with a preset comparison threshold, the doppler sensor determines whether or not the human body exists in the detectable range.

A heat ray sensor (so-called passive infrared (PIR) sensor) for detecting a heat ray irradiated from a human body may be used as a sensor for detecting a human body. Compared with the heat ray sensor, the doppler sensor is advantageous in that the doppler sensor is not easily affected by temperature variation of its environment and is capable of detecting a human body that is relatively remote therefrom. Accordingly, the doppler sensor is more adequate for the case of being used in a place whose temperature is variably changed or attached on a high ceiling of a building as compared with the heat ray sensor.

As described in FIGS. 3 and 4, an illumination device 1 as an example of the above-mentioned illumination device includes a straight tube fluorescent lamp 2 having a cylindrical light emitting unit as a light source; a device body 3, fixed to an installation surface (not shown), such as a wall surface, to support the fluorescent lamp 2; and a cover 4 provided to cover the device body 3, the fluorescent lamp 2 being disposed between the cover 4 and the device body 3.

Specifically, the fluorescent lamp 2 is a hot cathode discharge lamp, which is turned on with AC power. The fluorescent lamp 2 is well known in the art, and the detailed description thereof will be omitted.

Hereinafter, the illumination device 1 will be described with reference to FIGS. 3 and 4.

The device body 3 is of a long thin straight tube type and serves to hold a lighting device (not shown) for turning on the fluorescent lamp 2 and two sockets (not shown) that are electrically connected to the lighting device. As for the lighting device, an electronic ballast or a copper/iron ballast, which is well known, may be employed. The lighting device determines whether or not there exists a human body in a detectable range based on an output of a doppler sensor 5. Further, the lighting device turns on the fluorescent lamp 2 if it is determined that there exists a human body in the detectable range while the fluorescent lamp 2 is turned off, and turns off the fluorescent lamp 2 if a continuous time period, during which it is determined that there is not a human body in the detectable range, reaches a preset control time period while the fluorescent lamp 2 is turned on.

The two sockets are respectively provided at opposite end portions of the device body 3 in its longitudinal direction to correspond to caps (not shown) provided at opposite ends of a light emitting unit of the fluorescent lamp 2 in its axial direction, and are detachably coupled to the respective caps. In other words, in a state in which the sockets are respectively coupled to the caps, the fluorescent lamp 2 becomes electrically connected to the lighting device via the sockets, and the longitudinal direction of the device body 3 coincides with the axial direction of the light emitting unit of the fluorescent lamp 2. The lighting device and the sockets are well known and can be easily realized. Thus, the detailed illumination and description thereof are omitted.

The cover 4 is made of a light transmitting material, e.g., glass, and covers the fluorescent lamp 2 when viewed from the side illustrated by the fluorescent lamp 2 (upper side in FIG. 4). For example, the cover 4 serves to protect the fluorescent lamp 2 and to diffuse the light of the fluorescent lamp 2 in order to improve its visual quality.

The cover 4 is of a long thin rectangular flat plate shape, for example. The cover 4 is connected to the device body 3 through adequate iron brackets with a space therebetween such that the longitudinal direction of the cover 4 coincides with the longitudinal direction of the device body 3. In other words, the cover 4 is disposed in such a way that a surface thereof facing the fluorescent lamp 2 is positioned in a parallel relationship with a central axis of the light emitting unit of the fluorescent lamp 2.

In addition, the doppler sensor 5 is fixed to the device body 3 and disposed between the device body 3 and the cover 4. As shown in FIG. 4, a transreceiving unit 51 is provided on an upper portion of the doppler sensor 5 to face the cover 4, the transreceiving unit 51 serving as not only a transmitting unit for transmitting an electric wave from the doppler sensor 5 but also a receiving unit for receiving an electric wave. The detectable range of the doppler sensor 5 is of, e.g., a truncated circular cone shape having the transreceiving unit 51 as its peak and extending through the cover 4. The doppler sensor 5 is also well known and can be easily realized. Thus, the detailed illumination and description thereof are omitted.

However, when the detectable range of the doppler sensor 5 extends through the cover 4, a radiation noise generated from the fluorescent lamp 2 may be reflected by the cover 4 and enter the transreceiving unit 51 as indicated with an arrow A1 in FIG. 4, resulting in a mistake in determination.

SUMMARY OF THE INVENTION

In view of the above, the present invention provides an illumination device including a doppler sensor, capable of preventing a radiation noise from entering the doppler sensor.

In accordance with an embodiment of the present invention, there is provided an illumination device including a cover having a flat plate shape; a straight tube fluorescent lamp including a cylindrical light emitting unit, the fluorescent lamp being disposed at one side of the cover in a thickness direction thereof, the cover being substantially in a parallel relationship with a central axis of the light emitting unit of the fluorescent lamp; and a doppler sensor disposed on the same side as the fluorescent lamp with respect to a first plane including a surface of the cover which faces the fluorescent lamp, the doppler sensor including a receiving unit for receiving an electric wave from a detectable range having a part of the first plane. In a cross section that intersects the receiving unit and is orthogonal to the central axis of the light emitting unit of the fluorescent lamp, an angle "θ" between a boundary line of the detectable range close to the fluorescent lamp and a normal to the first plane, a distance "d" between the central axis of the light emitting unit and the first plane, a radius "r" of the light emitting unit; a distance "y" between the first plane and the receiving unit; and a distance "x" between the receiving unit and a second plane that includes the central axis of the light emitting unit and is orthogonal to the first plane satisfy the following equation.

$$x > (y+d)\tan\theta + \frac{r}{\cos\theta}$$

At least a part of the doppler sensor may be not overlapped with the cover when viewed in the thickness direction of the cover.

The doppler sensor may be disposed around an axially central portion of the light emitting unit of the fluorescent lamp.

The distance y may be larger than the distance d.

The doppler sensor may be disposed below the fluorescent lamp.

In accordance with the present invention, a radiation noise generated from the fluorescent lamp 2 hardly enters the doppler sensor 5 by only one-time reflection by the cover 4. As a result, it is difficult for the radiation noise to be introduced into the doppler sensor 5.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

An embodiment of the present invention will now be described with reference to the accompanying drawings which form a part hereof.

Figure 3:
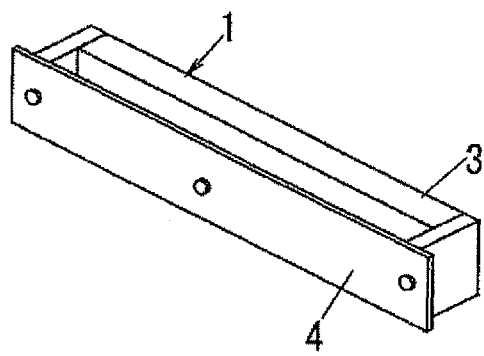
FIG. 3 is a perspective view showing an example of an illumination device including a doppler sensor.
Figure 4:
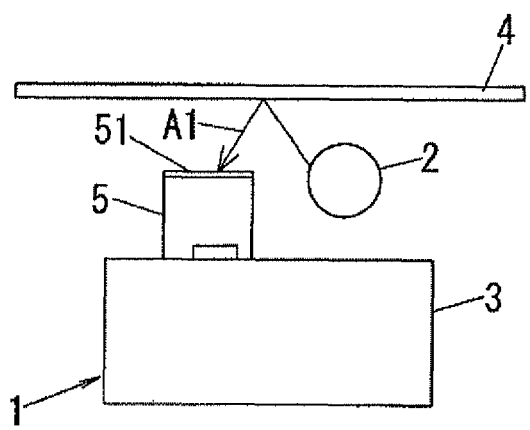
FIG. 4 is an explanatory view showing a weakness of the prior art.

The basic configuration of the present invention which is similar to that of the illumination device 1 shown in FIGS. 3 and 4 will be designated by like reference symbols, and like members will not be described in detail.

Figure 1:
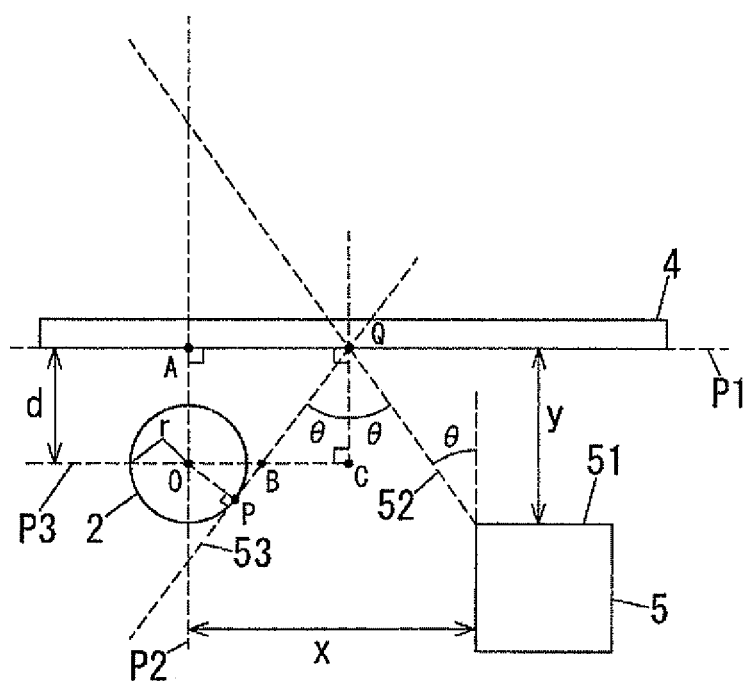
FIG. 1 is an explanatory view showing an embodiment of the present invention.

As shown FIG. 1, in the present embodiment, a fluorescent lamp 2, a cover 4 and a doppler sensor 5 are arranged in such a way that a radiation noise generated from the fluorescent lamp 2 does not enter a transreceiving unit 51 of the doppler sensor 5 even when the radiation noise is reflected by the cover 4.

The following descriptions will be made by using a first plane "P1" and a second plane "P2" that is orthogonal to the first plane P1. The first plane P1 serves as a virtual plane including a surface (lower surface in FIG. 1) of the cover 4, which faces the fluorescent lamp 2 and the doppler sensor 5, and the second plane P2 serves as a virtual plane including a central axis "O" of a light emitting unit of the fluorescent lamp 2.

First, a distance from the central axis O of the light emitting unit of the fluorescent lamp 2 to the first plane P1 (i.e., the cover 4) is referred to as a reference distance "d" hereinafter. Moreover, in a cross section that intersects the transreceiving unit 51 of the doppler sensor 5 and is orthogonal to the central axis O of the light emitting unit of the fluorescent lamp 2, the angle between a boundary line (contour) 52 of the detectable range which is close to the fluorescent lamp 2, and a normal to the first plane P1 from the transreceiving unit 51 is referred to as a "threshold incident angle θ" hereinafter.

The doppler sensor 5 may be affected by the radiation noise generated from the fluorescent lamp 2 in case that the radiation noise is reflected by the cover 4 to enter the transreceiving unit 51 of the doppler sensor 5 at an incident angle that is equal to or smaller than the threshold incident angle θ. This case will be described below.

The distance between the second plane P2 and the transreceiving unit 51 of the doppler sensor 5 is referred to as "x," and the distance between the first plane P1 and the transreceiving unit 51 of the doppler sensor 5 is referred to as "y."

A threshold incidence position of the doppler sensor 5 is defined as a position of the doppler sensor 5 that is disposed in such a way that a radiation noise, which is generated from the fluorescent lamp 2 in the tangential direction of a cross section of the light emitting unit and enters the first plane P1 at the threshold incident angle θ (0<θ<90°) to be reflected from the first plane P1, is introduced into an edge of the transreceiving unit 51, which is located close to the fluorescent lamp 2. When the threshold incidence position of the doppler sensor 5 is represented by using the distances x and y as shown in FIG. 1, the operation of the doppler sensor 5 is not affected by the radiation noise if x position of the doppler sensor 5 is set to be greater than that of the threshold incidence position and y position thereof is set to be smaller than that of the threshold incidence position.

Hereinafter, the description will be made on the conditions of the distances x and y to be satisfied on the cross section that intersects the transreceiving unit 51 of the doppler sensor 5 and is orthogonal to the central axis O of the light emitting unit of the fluorescent lamp 2.

First, an intersection point between the cross section, the first plane P1 and the second plane P2 is referred to as "A." Further, among tangential lines of the light emitting unit of the fluorescent lamp 2 in the cross section that approach the first plane P1 toward the doppler sensor 5 (inclined to an upper right side in FIG. 1), there is shown in FIG. 1 a tangential line 53, which has the threshold incident angle θ between itself and the normal to the first plane P1, and is close to the transreceiving unit 51 of the doppler sensor 5. Intersection points between the tangential line 53 and the first plane P1 and between the tangential line 53 and the light emitting unit of the fluorescent lamp 2 are respectively referred to as "Q" and "P." In other words, the segment AO is equivalent to the distance d, and the segment OP is equivalent to the radius "r" of the light emitting unit of the fluorescent lamp 2.

As a result, the distance x should satisfy the following Eq. 1.

$$x > \overline{AQ} + y\tan\theta \qquad \text{Eq. 1}$$

Further, a third plane P3 serves as a virtual plane which is parallel to the first plane P1 and includes the central axis O. An intersection point between the third plane P3 and the tangential line 53 is referred to as "B," and an intersection point between the third plane P3 and the normal to the third plane P3 with respect to the point Q is referred to as "C." Then, it is seen from the homologous relationship between the triangle QBC and the triangle OBP that the angle BOP is equivalent to the angle BQC, i.e., the threshold incident angle θ. The segment OB is represented as "r/cos θ." As a result, the following Eq. 2 is satisfied.

$$\overline{AQ} = \overline{OC} = \overline{BC} + \overline{OB} = d\tan\theta + r/\cos\theta \qquad \text{Eq. 2}$$

If Eq. 2 is put into Eq. 1, the following Eq. 3 is obtained in order to prevent a radiation noise generated from the fluorescent lamp 2 from being reflected by the cover 4 and then entering into the transreceiving unit 51 of the doppler sensor 5 at an incident angle that is equal to or smaller than the threshold incident angle θ.

$$x > (y+d)\tan\theta + \frac{r}{\cos\theta} \qquad \text{Eq. 3}$$

In other words, the positional relationship between the fluorescent lamp 2, the cover 4 and the doppler sensor 5 is determined in such a way that a radiation noise generated from the fluorescent lamp 2 does not enter the detectable range of the doppler sensor 5 even when the fluorescent lamp 2 is disposed to be symmetric with respect to the inner surface (first plane P1) of the cover 4.

With the above-mentioned configuration, the radiation noise generated from the fluorescent lamp 2 does not enter the doppler sensor 5 by only one-time reflection by the cover 4. As a result, it is difficult for the radiation noise to be introduced into the doppler sensor 5.

For the scaling down of the illumination device, it is preferable to set the distance x as small as possible in the allowable range of Eq. 3.

Figure 2:
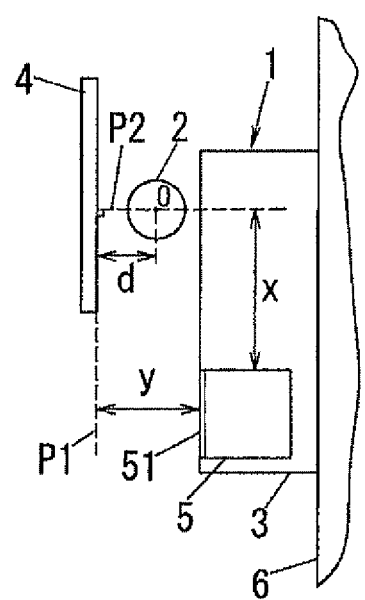
FIG. 2 an explanatory view showing a modification of the present embodiment.

In order to suppress the influence of the cover 4 from being exerted on the operation of the doppler sensor 5, it is also preferable to respectively determine the dimension and shape of the cover 4 and the positional relationship between the cover 4 and the doppler sensor 5 in such a way that at least a part of the transreceiving unit 51 of the doppler sensor 5 is not overlapped with the cover 4 when viewed in the thickness direction of the cover 4 (right and left direction in FIG. 2) (or the transreceiving unit 51 of the doppler sensor 5 is not completely covered with the cover 4 when viewed from the outside of the illumination device 1) as shown in FIG. 2.

In the example shown in FIG. 2, the distance y is larger than the reference distance d. In FIG. 2, the illumination device 1 is attached on a wall surface 6 such that the doppler sensor 5 is located below the fluorescent lamp 2. When the doppler sensor 5 is disposed in the axial direction (orthogonal to the ground plane in FIG. 1 or 2) of the light emitting unit of the fluorescent lamp 2, the doppler sensor 5 may be disposed around an axially central portion of the light emitting unit of the fluorescent lamp 2, for example. As such, the positional relationship between the fluorescent lamp 2 and the doppler sensor 5 may be adequately varied in the allowable range of Eq. 3 in consideration of design features and the like.

For example, when the radius r of the light emitting unit of the fluorescent lamp 2, the reference distance d, the threshold incident angle θ and the distance y between the first plane P1 and the transreceiving unit 51 are respectively set as 13 mm, 27 mm, 30° and 49 mm, the distance x between the second plane P2 and the transreceiving unit 51 should be set as 74 mm or more in order to prevent the radiation noise generated from the fluorescent lamp 2 from entering the doppler sensor 5.

To suppress the radiation noise from being reflected by the cover 4, it is preferable to set the thickness of the cover 4 to be an integer multiple of a half wavelength of an electric wave transmitted by the doppler sensor 5 when the electric wave passes through the cover 4. For example, when tempered glass having a dielectric constant of 6.2 is employed as a material of the cover 4 and the electric wave transmitted by the doppler sensor 5 has the frequency of 24.15 GHz (wavelength of 12.4 mm), the half wavelength of the electric wave when passing through the cover 4 becomes about 2.5 mm (12.4/2·√6.2). As a result, it is preferable to set the thickness of the cover 4 as 5 mm (2×2.5 mm), for example.

While the invention has been shown and described with respect to the embodiments, it will be understood by those skilled in the art that various changes and modifications may be made without departing from the scope of the invention as defined in the following claims.

What is claimed is:

1. An illumination device comprising:
   a cover having a flat plate shape;
   a straight tube fluorescent lamp including a cylindrical light emitting unit, the fluorescent lamp being disposed at one side of the cover in a thickness direction thereof, the cover being substantially in a parallel relationship with a central axis of the light emitting unit of the fluorescent lamp; and
   a doppler sensor disposed on the same side as the fluorescent lamp with respect to a first plane including a surface of the cover which faces the fluorescent lamp, the doppler sensor including a receiving unit for receiving an electric wave from a detectable range having a part of the first plane,
   wherein, in a cross section that intersects the receiving unit and is orthogonal to the central axis of the light emitting unit of the fluorescent lamp, an angle "θ" between a boundary line of the detectable range close to the fluorescent lamp and a normal to the first plane, a distance "d" between the central axis of the light emitting unit and the first plane, a radius "r" of the light emitting unit; a distance "y" between the first plane and the receiving unit; and a distance "x" between the receiving unit and a second plane that includes the central axis of the light emitting unit and is orthogonal to the first plane satisfy the following equation $$x > (y+d)\tan\theta + \frac{r}{\cos\theta}.$$

2. The illumination device of claim 1, wherein at least a part of the doppler sensor is not overlapped with the cover when viewed in the thickness direction of the cover.

3. The illumination device of claim 1, wherein the doppler sensor is disposed around an axially central portion of the light emitting unit of the fluorescent lamp.

4. The illumination device of claim 1, wherein the distance y is larger than the distance d.

5. The illumination device of claim 1, wherein the doppler sensor is disposed below the fluorescent lamp.

* * * * *